(12) United States Patent
Xu et al.

(10) Patent No.: US 8,273,484 B2
(45) Date of Patent: Sep. 25, 2012

(54) NITROGEN SILYLATED COMPOUNDS AS ADDITIVES IN NON-AQUEOUS SOLUTIONS FOR ELECTROCHEMICAL CELLS

(75) Inventors: Wu Xu, Broadview Heights, OH (US);
Zhongyi Deng, Valley View, OH (US);
Pascal Bolomey, Solon, OH (US)

(73) Assignee: Novolyte Technologies, Inc., Independence, OH (US)

( * ) Notice: Subject to any disclaimer, the term of this patent is extended or adjusted under 35 U.S.C. 154(b) by 2411 days.

(21) Appl. No.: 11/138,905

(22) Filed: May 26, 2005

(65) Prior Publication Data

US 2006/0269846 A1    Nov. 30, 2006

(51) Int. Cl.
*H01M 6/16*    (2006.01)
(52) U.S. Cl. ......... 429/328; 429/339; 429/326; 429/329
(58) Field of Classification Search ............... 429/326, 429/325, 328, 334, 339, 329, 336; 252/62.2
See application file for complete search history.

(56) References Cited

U.S. PATENT DOCUMENTS

| | | |
|---|---|---|
| 5,484,670 A | 1/1996 | Angell |
| 5,521,027 A | 5/1996 | Okuno |
| 5,525,443 A | 6/1996 | Okuno |
| 5,554,462 A | 9/1996 | Flandrois |
| 5,626,981 A | 5/1997 | Simon |
| 5,654,439 A * | 8/1997 | Pandey et al. ............... 548/406 |
| 5,707,759 A | 1/1998 | Simon |
| 5,776,627 A | 7/1998 | Mao |
| 5,786,110 A | 7/1998 | Angell |
| 5,824,433 A | 10/1998 | Angell |
| 5,849,432 A | 12/1998 | Angell |
| 5,855,809 A | 1/1999 | Angell |
| 5,932,632 A | 8/1999 | Biensan |
| 5,962,169 A | 10/1999 | Angell |
| 6,001,325 A | 12/1999 | Salmon |
| 6,033,797 A | 3/2000 | Mao |
| 6,033,808 A | 3/2000 | Salmon |
| 6,071,645 A | 6/2000 | Biensan |
| 6,103,798 A | 8/2000 | Prabhu |
| 6,245,465 B1 | 6/2001 | Angell |
| 6,365,643 B1 * | 4/2002 | Oestreich et al. ............... 522/31 |
| 6,506,516 B1 | 1/2003 | Wietelmann |
| 6,548,212 B1 | 4/2003 | Heider et al. |
| 6,787,267 B2 | 9/2004 | Tsujioka et al. |
| 7,172,834 B1 | 2/2007 | Jow et al. |
| 7,238,453 B2 | 7/2007 | Xu et al. |
| 7,255,965 B2 | 8/2007 | Xu et al. |
| 7,459,237 B2 | 12/2008 | Totir et al. |
| 2004/0151951 A1 | 8/2004 | Hyung |
| 2004/0253512 A1 | 12/2004 | Watanabe |
| 2004/0259002 A1 * | 12/2004 | Kim et al. ............... 429/326 |
| 2005/0044778 A1 * | 3/2005 | Orr ............... 44/320 |
| 2006/0269844 A1 | 11/2006 | Deng et al. |
| 2006/0269845 A1 | 11/2006 | Xu et al. |
| 2007/0224515 A1 | 9/2007 | Xu et al. |
| 2007/0231706 A1 | 10/2007 | Xu et al. |
| 2009/0017386 A1 | 1/2009 | Xu et al. |

FOREIGN PATENT DOCUMENTS

| | | |
|---|---|---|
| JP | 1998050344 A | 2/1998 |
| JP | 2000315504 A | 11/2000 |
| JP | 2002208432 A | 7/2002 |
| WO | WO 01/99209 A2 | 12/2001 |

OTHER PUBLICATIONS

Kang Xu, Shengshui Zhang, T. Richard Jow, Wu Xu, and C. Austen Angell; "LiBOB as Salt for Lithium-Ion Batteries A Possible Solution for High Temperature Operation"; Electrochemical and Solid-State Letters, 5 (1) A26-A29 (2002); The Electrochemical Society, Inc.
Wu Xu and C. Austen Angell; "LiBOB and Its Derivatives Weakly Coordinating Anions, and the Exceptional Conductivity of Their Nonaqueous Solutions"; Electrochemical and Solid-State Letters, 4 (1) E1-E4 (2001); The Electrochemical Society, Inc.
Kang Xu, Shengshui Zhang, Bruce A. Poese, and T. Richard Jow; "Lithium Bis(oxalato)borate Stablizes Graphite Anode in Propylene Carbonate"; Electrochemical and Solid-State Letters, 5 (11) A259-A262 (2002); The Electrochemical Society, Inc.
Commonly Owned U.S. Appl. No. 11/113,966, filed Apr. 25, 2005.
Commonly Owned U.S. Appl. No. 11/138,769, filed May 26, 2005.
Commonly Owned U.S. Appl. No. 11/138,907, filed May 26, 2005.
Commonly Owned U.S. Appl. No. 11/113,823, filed Apr. 25, 2005.
Commonly Owned U.S. Appl. No. 11/196,782, filed Aug. 3, 2005.

* cited by examiner

*Primary Examiner* — Raymond Alejandro
(74) *Attorney, Agent, or Firm* — Melanie L. Brown

(57) ABSTRACT

Nitrogen silylated compounds are useful as additives in a nonaqueous electrolytic solution. The electrolytic solution including such additives is suitable for use in electrochemical cells such as lithium and lithium ion batteries. Batteries using this electrolytic solution have long cycle life and high capacity retention.

11 Claims, 2 Drawing Sheets

NITROGEN SILYLATED COMPOUNDS AS ADDITIVES IN NON-AQUEOUS SOLUTIONS FOR ELECTROCHEMICAL CELLS

BACKGROUND OF THE INVENTION

1. Field of Invention

The present invention relates to the field of nonaqueous electrolytic solutions and batteries using the same. More particularly, this invention pertains to nonaqueous electrolytic solutions comprising (a) one or more solvents; (b) one or more ionic salts; and (c) one or more nitrogen silylated compounds. Rechargeable batteries comprising such nonaqueous electrolytic solutions are disclosed herein as well as methods of making nonaqueous electrolytic solutions with nitrogen silylated compounds to scavenge moisture and free acid in lithium batteries and lithium ion batteries.

2. Description of Related Art

Electric current producing cells such as batteries consist of pairs of electrodes of opposite polarity separated by electrolytic solution, which includes a solvent and a solute. The charge flow between electrodes is maintained by an ionically conducting solute, i.e., a salt. The non-aqueous electrolytic solutions, which are used in lithium and lithium ion batteries, are made by dissolving lithium salts in a variety of organic solvents. In particular, nonaqueous electrolytes comprising lithium hexafluorophosphate ($LiPF_6$) exhibit very good electrochemical stability and conductivity. However, $LiPF_6$ is not thermally stable and readily decomposes by hydrolysis, as set forth in the following well-known reactions:

$$LiPF_6 \rightarrow LiF + PF_5 \quad (1)$$

$$LiPF_6 + H_2O \rightarrow 2HF + LiF + POF_3 \quad (2)$$

Thermal decomposition of $LiPF_6$ occurs at elevated temperatures (Reaction 1), and is accelerated in solution due to the reactions of $PF_5$ and solvents. Hydrolysis (Reaction 2) generally occurs due to moisture and acidic impurities in the lithium salt and electrolytic solution. Accordingly, both water and hydrogen fluoride (HF) are undesirable in lithium and lithium-ion battery systems. The strong acid HF is especially harmful to batteries because it reacts with electrode active materials and corrodes the solid electrolyte interface (SEI), which results in poor battery performance. Thus the performance of such an electrolytic solution, and hence of a battery made therewith, is not optimal.

SUMMARY OF THE INVENTION

The present invention provides a stable nonaqueous electrolytic solution for use in secondary batteries, and a secondary battery using the same. In particular, the present invention provides a secondary battery comprising an anode, a cathode, and an electrolytic solution. The electrolytic solution comprises a non-aqueous solvent, a salt, and a nitrogen silylated compound. It is believed that the use of a nitrogen silylated compound in a secondary battery is novel. A battery made with the non-aqueous electrolytic solution comprising a nitrogen silylated compound has a long cycle life and high discharge capacity retention. The present invention provides a nonaqueous electrolytic solution comprising a nitrogen silylated compound. The nitrogen silylated compound acts as a scavenger for moisture and free acid in lithium batteries and lithium ion batteries.

The present invention provides a nonaqueous electrolytic solution comprising a nitrogen silylated compound. Nitrogen silylated compounds, which are electrically neutral, act as scavengers for moisture and free acid in electrolytic solutions and lithium ion batteries.

The electrolytic solution in the present invention comprises (a) one or more solvents and (b) one or more lithium salts; and (c) one or more nitrogen silylated compounds. Typical lithium salts include $LiPF_6$, $LiBF_4$, $LiB(C_2O_4)$ (i.e. LiBOB), however others may be used. Solvents include ethylene carbonate (EC), propylene carbonate (PC), dimethyl carbonate (DMC), diethyl carbonate (DEC), ethylmethyl carbonate (EMC), gamma-butyrolactone (GBL), methyl butyrate (MB), and propyl acetate (PA), however other non-aqueous solvents could be used. The nitrogen silylated compound has Formula (I) wherein $R^1$, $R^2$, and $R^3$ are each independently a $C_1$-$C_{20}$ hydrocarbon residue.

Formula (I)

In particular, the invention provides a secondary battery comprising an anode, a cathode comprising lithium, and an electrolytic solution. The electrolytic solution comprises a non-aqueous solvent, a salt, and an nitrogen silylated compound having the formula (I) wherein $R^1$, $R^2$, and $R^3$ are each independently selected from the group consisting of hydrogen, halogen, $C_1$-$C_{20}$ alkyl, $C_1$-$C_{20}$ alkenyl, and aryl residue, wherein X and Y are each independently selected from the group consisting of hydrogen, halogen, $C_1$-$C_{20}$ alkyl, $C_1$-$C_{20}$ alkenyl, aryl, —O—, —S—, —CO—, —$CO_2$—, —SO—, —$SO_2$—, —$NR_9$—, —$NR_{10}R_{11}$, —$PR_{12}$—, and —Si$(R_{13}R_{14})$. Substituents $R_9$ to $R_{14}$ are each independently selected from the group consisting of hydrogen, halogen, $C_1$-$C_{20}$ alkyl, $C_1$-$C_{20}$ alkenyl, and aryl. Substituent Z is selected from the group consisting of nothing, a direct bond between X and Y, —O—, —S—, —CO—, —$CO_2$—, —SO—, —$SO_2$—, —$N(R_{15})$—, —$NR_{16}R_{17}$, —$PR_{18}$—, —Si$(R_{19}R_{20})$—, and $[C(R_{21})_2]_m$—. Substituents $R_{15}$ to $R_{21}$ are each independently selected from the group consisting of hydrogen, halogen, $C_1$-$C_{20}$ alkyl, $C_1$-$C_{20}$ alkenyl, and aryl, and m is a number from 1 to 6.

The invention further includes a method of making a lithium battery or lithium ion battery comprising providing an electrolytic solution comprising a non-aqueous electrolytic solvent and a lithium containing salt, and an additive having the formula (I) wherein $R^1$, $R^2$, and $R^3$ are each independently selected from the group consisting of hydrogen, halogen, $C_1$-$C_{20}$ alkyl, $C_1$-$C_{20}$ alkenyl, and aryl residue, wherein X and Y are each independently selected from the group consisting of hydrogen, halogen, $C_1$-$C_{20}$ alkyl, $C_1$-$C_{20}$ alkenyl, aryl, —O—, —S—, —CO—, —$CO_2$—, —SO—, —$SO_2$—, —$NR_9$—, —$NR_{10}R_{11}$, —$PR_{12}$—, and —Si$(R_{13}R_{14})$—. Substituents $R_9$ to $R_{14}$ are each independently selected from the group consisting of hydrogen, halogen, $C_1$-$C_{20}$ alkyl, $C_1$-$C_{20}$ alkenyl, and aryl. Substituent Z is selected from the group consisting of nothing, a direct bond between X and Y, —O—, —S—, —CO—, —$CO_2$—, —SO—, —$SO_2$—, —$N(R_{15})$—, —$NR_{16}R_{17}$, —$PR_{18}$—, —Si$(R_{19}R_{20})$—, and $[C(R_{21})_2]_m$—. Substituents $R_{15}$ to $R_{21}$ are each independently selected from the group consisting of hydrogen, halogen, $C_1$-$C_{20}$ alkyl, $C_1$-$C_{20}$ alkenyl, and aryl, and m is a number from 1 to 6; laminating and winding a cathode, a first porous separator, an anode, and a second porous separator; placing the wound laminated electrodes and separators in a battery case; infusing the electrolytic solution into the battery case, and sealing the battery case containing the electrodes, electrolytic solution and separators.

These and other features and advantages of the present invention will become readily apparent to those skilled in the art upon consideration of the following detailed description that described both the preferred and alternative embodiments of the present invention.

DETAILED DESCRIPTION OF THE INVENTION

Figure 1:
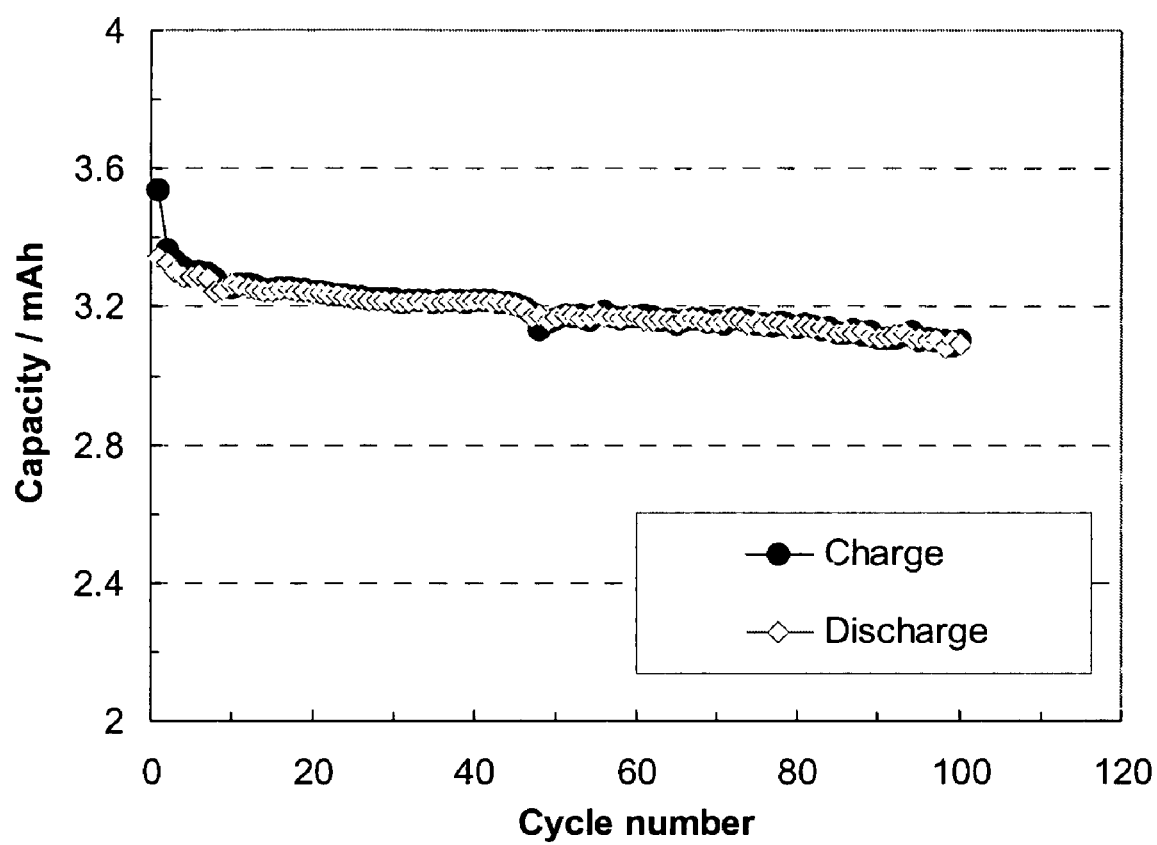
FIG. 1 is a graphical depiction of the charge and discharge capacities over 100 cycles of charge and discharge of the battery of Example 5.
Figure 2:
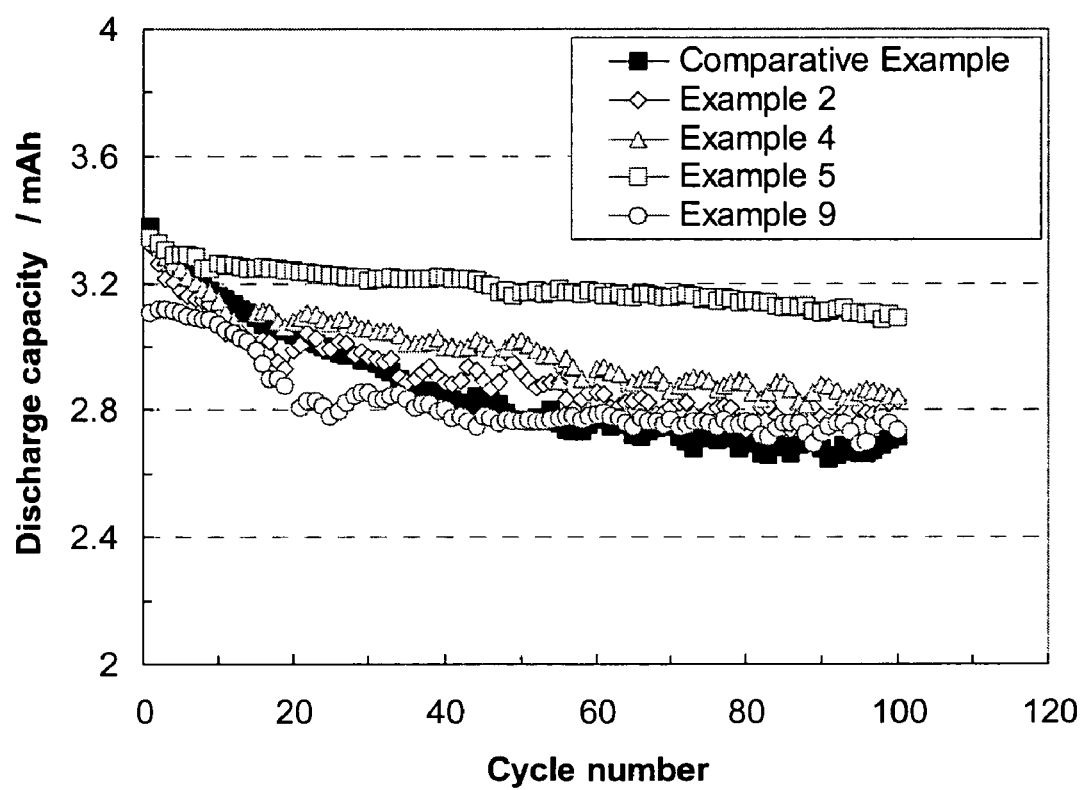
FIG. 2 is a graphical depiction of the discharge capacity of working Examples 2, 4, 5, and 9, over a 100 cycle trial.

The following embodiments describe the preferred and alternative modes presently contemplated for carrying out the invention and are not intended to describe all possible modifications and variations consistent with the spirit and purpose of the invention. These and other features and advantages of the present invention will become more readily apparent to those skilled in the art upon consideration of the following detailed description that described both the preferred and alternative embodiments of the present invention.

Nitrogen silylated compounds are strongly hygroscopic. Upon contact with residual moisture in an electrolytic solution, they form a siloxyl compound and an amine compound. The latter product can then react with the free acid in the electrolytic solution to form a quaternary ammonium salt. In this way, both the moisture and free acid content in the electrolytic solution decreases.

Broadly, a secondary battery (and a method of making such a battery) is disclosed, which comprises an anode, a cathode and an electrolytic solution. The electrolytic solution comprises a non-aqueous solvent, a solute (i.e., a salt) and a nitrogen silylated compound additive. These major ingredients are detailed hereinbelow.

Nitrogen silylated compound. The nitrogen silylated compound may be represented by the general Formula (I):

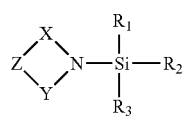

Formula (I)

In the formula, $R_1$, $R_2$ and $R_3$ are each independently a hydrogen, halogen, $C_1$-$C_{20}$ alkyl, $C_1$-$C_{20}$ alkenyl or aryl. Further, any of $R_1$, $R_2$ and $R_3$ may optionally contain at least one —O—, —S—, —CO—, —CO$_2$—, —SO—, —SO$_2$—, —NR$_4$—, —NR$_4$R$_5$, —PR$_6$—, or —Si(R$_7$R$_8$)— moiety, wherein $R_4$ to $R_8$ are each independently a hydrogen, halogen, $C_1$-$C_{20}$ alkyl, $C_1$-$C_{20}$ alkenyl or aryl group, and may optionally contain at least one —O—, —S—, —CO—, —CO$_2$—, —SO—, —SO$_2$—, amine, phosphorous linkage or silica linkage. It is possible for each of $R_1$, $R_2$, and $R_3$ to be the same residue. $R_1$, $R_2$ and $R_3$ are preferably $C_1$ to $C_{12}$ residues, and more preferably $C_1$ to $C_6$ residues, and most preferably a $C_1$ residue (i.e., methyl). By "alkyl", "alkenyl", and "aryl" are also comprehended such residues having substituents, i.e., substituted alkyl, substituted alkenyl and substituted aryl. Each of $R^1$, $R^2$, and $R^3$ may be saturated or unsaturated. Saturated residues are preferred.

Further, X and Y are each independently a hydrogen, halogen, $C_1$-$C_{20}$ alkyl, $C_1$-$C_{20}$ alkenyl, aryl group, or may optionally contain one of —O—, —S—, —CO—, —CO$_2$—, —SO—, —SO$_2$—, —NR$_9$—, —NR$_{10}$R$_{11}$, —PR$_{12}$—, or —Si(R$_{13}$R$_{14}$)— moiety, wherein $R_9$ to $R_{14}$ is independently a hydrogen, halogen, $C_1$-$C_{20}$ alkyl, $C_1$-$C_{20}$ alkenyl, or aryl. Any of $R_9$ to $R_{14}$ may optionally contain at least one —O—, —S—, —CO—, —CO$_2$—, —SO—, —SO$_2$—, amine, phosphorous linkage or silica linkage. It is possible for each of X and Y to be the same residue.

Substituent Z may be nothing or a direct bond between X and Y, or may be one of —O—, —S—, —CO—, —CO$_2$—, —SO—, —SO$_2$—, —N(R$_{15}$)—, —NR$_{16}$R$_{17}$, —PR$_{18}$—, —Si(R$_{19}$R$_{20}$)—, or —[C(R$_{21}$)$_2$]$_m$—, wherein $R_{15}$ to $R_{21}$ are each independently a hydrogen, halogen, $C_1$-$C_{20}$ alkyl, $C_1$-$C_{20}$ alkenyl, or aryl, and m is a number from 1 to 6.

In a preferred embodiment, the non-aqueous electrolytic solution comprises about 0.01 to about 10 wt %, preferably about 0.05 to about 5 wt % and more preferably about 0.1 to about 3 wt % of one or more nitrogen silylated compounds.

The electrolytic solutions comprising a nitrogen silylated compound have a low level of residual moisture and acids thereby limiting or reducing decomposition and hydrolysis of the lithium salts, and therefore, of the electrolytic solutions. Preferred embodiments of the invention are described below for the treatment of LiPF$_6$ based electrolytes but the invention is not limited thereto and may be used with lithium salts in general such as LiBF$_4$, LiAsF$_6$, LiSbF$_6$, LiBOB, LiCF$_3$SO$_3$, LiN(SO$_2$CF$_3$)$_2$, and others, as well as combinations of such salts.

The nitrogen silylated compounds useful herein include:

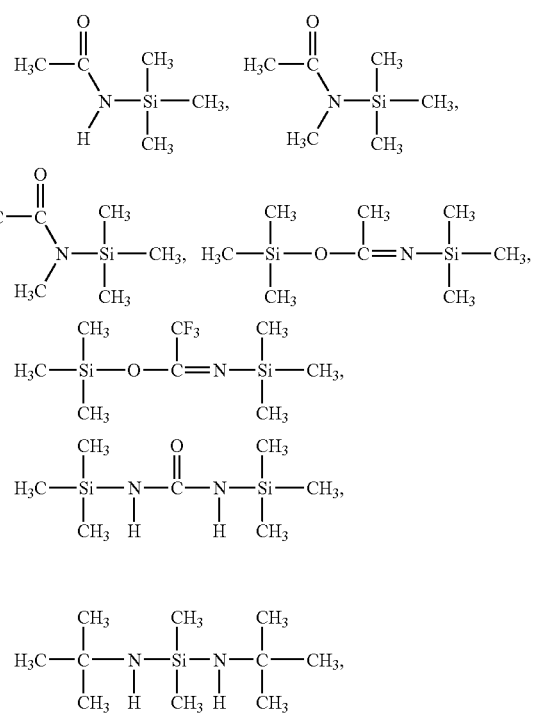

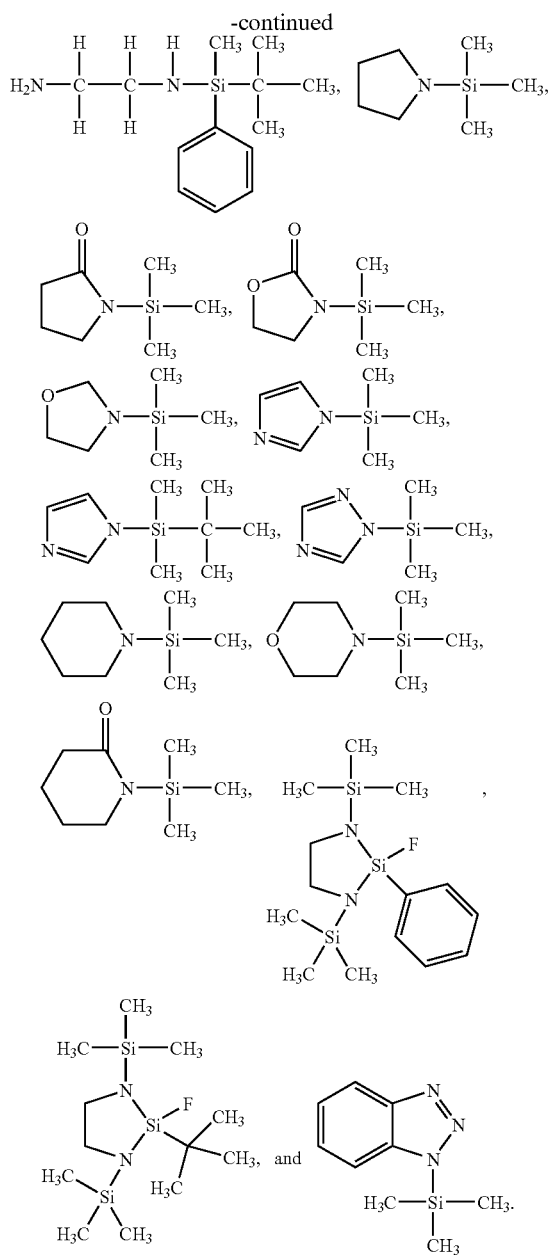

Combinations of these compounds may also be used.

Salts. The salts herein are ionic salts containing at least one metal ion. Typically this metal ion is lithium ($Li^+$). The salts herein function to transfer charge between the anode and the cathode of a battery. One class of salts includes lithium salts that are perhalogenated, or peroxidated, for example, $LiPF_6$, $LiBF_4$, $LiAsF_6$, $LiTaF_6$, $LiAlCl_4$, $Li_2B_{10}Cl_{10}$, $LiClO_4$, $LiCF_3SO_3$, $LiN(SO_2C_mF_{2m+1})(SO_2C_nF_{2n+1})$, and $LiC(SO_2C_kF_{2k+1})(SO_2C_mF_{2m+1})(SO_2C_nF_{2n+1})$, wherein k=1-10, m=1-10, and n=1-10, respectively; $LiN(SO_2C_pF_{2p}SO_2)$, and $LiC(SO_2C_pF_{2p}SO_2)(SO_2C_qF_{2q+1})$ wherein p=1-10 and q=1-10; $LiPF_x(R_F)_{6-x}$, and $LiBF_y(R_F)_{4-y}$, wherein $R_F$ represents perfluorinated $C_1$-$C_{20}$ alkyl groups or perfluorinated aromatic groups, x=0-5 and y=0-3. Another class of salts useful herein includes lithium salts of chelated orthoborates and chelated orthophosphates (collectively hereinafter, "ortho-salts"), including lithium bis(oxalato)borate (LiBOB), lithium bis (malonato)borate (LiBMB), lithium bis(difluoromalonato) borate (LiBDFMB), lithium (malonato oxalato)borate (Li-MOB), lithium (difluoromalonato oxalato)borate (LiDFMOB), lithium tris(oxalato)phosphate (LiTOP), and lithium tris(difluoromalonato)phosphate (LiTDFMP). Any combination of two or more of the aforementioned salts may also be used. Most preferably the salt comprises $LiPF_6$.

Broadly, the concentration of salts in the electrolytic solution is about 0.01-2.5 M (moles per liter). Preferably the total of all salts in the electrolytic solution is about 1 wt % to about 50 wt %, preferably about 3 wt % to about 35 wt % and more preferably about 5 wt % to about 25 wt %.

Solvent. The solvent is a non-aqueous, aprotic, polar organic substance which dissolves the salt at room temperature, i.e., about 23° C. Blends of more than one solvent may be used. Generally, solvents may be carbonates, carboxylates, lactones, phosphates, five or six member heterocyclic ring compounds, and organic compounds having at least one $C_1$-$C_4$ group connected through an oxygen atom to a carbon. Lactones may be methylated, ethylated and/or propylated. Useful solvents herein include ethylene carbonate, propylene carbonate, butylene carbonate, dimethyl carbonate, diethyl carbonate, dipropyl carbonate, dibutyl carbonate, ethyl methyl carbonate, methyl propyl carbonate, ethyl propyl carbonate, tetrahydrofuran, 2-methyl tetrahydrofuran, 1,3-dioxolane, 1,4-dioxane, 1,2-dimethoxyethane, 1,2-diethoxyethane, 1,2-dibutoxyethane, acetonitrile, dimethylformamide, methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, γ-butyrolactone, 2-methyl-γ-butyrolactone, 3-methyl-γ-butyrolactone, 4-methyl-γ-butyrolactone, β-propiolactone, δ-valerolactone, trimethyl phosphate, triethyl phosphate, tris(2-chloroethyl)phosphate, tris(2,2,2-trifluoroethyl)phosphate, tripropyl phosphate, triisopropyl phosphate, tributyl phosphate, trihexyl phosphate, triphenyl phosphate, tritolyl phosphate, and combinations thereof. Other solvents may be used so long as they are non-aqueous and aprotic, and are capable of dissolving the salts.

Overall, the non-aqueous electrolytic solution comprises about 20 wt % to about 99 wt %, preferably about 50 wt % to about 97 wt % and more preferably about 70 wt % to about 95 wt % of one or more solvents. In a preferred embodiment, the solvent is selected from the group consisting of ethylene carbonate (EC), propylene carbonate (PC), dimethyl carbonate (DMC), ethyl methyl carbonate (EMC), diethyl carbonate (DEC) and combinations thereof. In another preferred embodiment, the solvent comprises about 1-60% wt % EC, and about 1-99 wt % DMC, and about 1-99 wt % EMC. In another preferred embodiment, the non-aqueous solvent comprises EC, DMC and EMC in a weight ratio of 1:1:1.

Cathode. The cathode comprises a lithium metal oxide compound. In particular, the cathode comprises at least one lithium mixed metal oxide (MMO). Lithium MMOs contain at least one other metal selected from the group consisting of Mn, Co, Cr, Fe, Ni, V, and combinations thereof. For example the following lithium MMOs may be used in the cathode: $LiMnO_2$, $LiMn_2O_4$, $LiCoO_2$, $Li_2Cr_2O_7$, $Li_2CrO_4$, $LiNiO_2$, $LiFeO_2$, $LiNi_zCo_{1-z}O_2$ (0<z<1), $LiFePO_4$, $Li_3VPO_4$, $LiMn_{0.5}Ni_{0.5}O_2$, $LiMn_{1/3}Co_{1/3}Ni_{1/3}O_2$, $LiNi_rCo_sMe_tO_2$ wherein Me may be one or more of Al, Mg, Ti, B, Ga, or Si and 0<r,s,t<1, and $LiMc_{0.5}Mn_{1.5}O_4$ wherein Mc is a divalent metal, and mixtures thereof.

Anode. The anode may comprise carbon or compounds of lithium. The carbon may be in the form of graphite. Lithium metal anodes may be used. Lithium MMOs such as $LiMnO_2$ and $Li_4Ti_5O_{12}$ are also envisioned. Alloys of lithium with transition or other metals (including metalloids) may be used, including LiAl, LiZn, $Li_3Bi$, $Li_3Cd$, $Li_3Sd$, $Li_4Si$, $Li_{4.4}Pb$, $Li_{4.4}Sn$, $LiC_6$, $Li_3FeN_2$, $Li_{2.6}Co_{0.4}N$, $Li_{2.6}Cu_{0.4}N$, and combinations thereof. The anode may further comprise an additional material such as a metal oxide including SnO, $SnO_2$, GeO, $GeO_2$, $In_2O$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, SiO, ZnO, CoO, NiO, FeO, and combinations thereof.

Either the anode or the cathode, or both, may further comprise a polymeric binder. In a preferred embodiment, the binder may be polyvinylidene fluoride, styrene-butadiene rubber, polyamide or melamine resin, and combinations thereof.

The electrolytic solution in the present invention may further comprise one or more additives, such as a vinyl compound (e.g. vinylene carbonate, vinyl ethylene carbonate) to help generate a stable solid electrolyte interface at the surface of the graphite anode so as to increase the cycle life characteristic of the battery, and/or a sultone (e.g., 1,3-propane sultone, and 1,4-butane sultone) to prevent or to reduce gas generation of the electrolytic solution as the battery is charged and discharged at temperatures higher than ambient temperature, and/or an aromatic compound (e.g., biphenyl and cyclohexylbenzene) to prevent overcharge or overdischarge of the battery.

It is envisioned that the electrolytic solutions and batteries discussed herein have a wide range of applications, including, at least, radios, televisions, calculators, wrist watches, hearing aids, electronics such as computers, cell phones, games etc, and transportation applications such as battery powered and/or hybrid vehicles.

EXAMPLES

The following compositions represent exemplary embodiments of the invention. They are presented to explain the invention in more detail, and do not limit the invention.

(1) Preparation of the Non-aqueous electrolytic solutions. The starting point for the examples was to blend a solvent mixture of EC/DMC/EMC (1:1:1 by weight) which were commercially available under the Purolyte® name from Ferro Corporation, and then $LiPF_6$ was added until a non-aqueous electrolytic solution having a $LiPF_6$ concentration of 1.0 M was obtained. This formed the non-aqueous electrolytic solution used in the Comparative Example. For the Working Examples, the nitrogen silylated compounds in Table 1 were added to obtain a solution with the indicated concentrations in wt % of the overall solution. The blending and testing was carried out at room temperature. A battery using each of these non-aqueous electrolytic solutions was also made.

TABLE 1

Additive type and amount used in 2032 coin cell type batteries.

| Example | Additive Name | Additive Amount |
| --- | --- | --- |
| Example 1 | 1-Trimethylsilyl-2-pyrrolidinone | 0.3 wt % |
| Example 2 | 3-Trimethylsily-2-oxazolidinone | 0.3 wt % |
| Example 3 | 1-Trimethylsily-1,2,4-triazole | 0.3 wt % |
| Example 4 | 1-Trimethylsilyl pyrrolidine | 0.3 wt % |
| Example 5 | 4-Trimethylsilyl morpholine | 0.3 wt % |
| Example 6 | 3-Trimethylsily-2-oxazolidinone | 1.0 wt % |
| Example 7 | 1-Trimethylsily-1,2,4-triazole | 1.0 wt % |

TABLE 1-continued

Additive type and amount used in 2032 coin cell type batteries.

| Example | Additive Name | Additive Amount |
| --- | --- | --- |
| Example 8 | 1-Trimethylsilyl pyrrolidine | 1.0 wt % |
| Example 9 | 4-Trimethylsilyl morpholine | 1.0 wt % |
| Comparative Example | None | None |

(2) Preparation of a Cathode. A positive electrode slurry was prepared by dispersing $LiCoO_2$ (positive electrode active material, 90 wt %), poly(vinylidenefluoride) (PVdF, binder, 5 wt %), and acetylene black (electro-conductive agent, 5 wt %) into 1-methyl-2-pyrrolidone (NMP). The slurry was coated on aluminum foil, dried, and compressed to give a cathode. The cathode was die-cut into discs by a punch with a diameter of 12.7 mm.

(3) Preparation of an Anode. Artificial graphite (as negative electrode active material, 95 wt %) and PVdF (as binder, 5 wt %) were mixed into NMP to give a negative active material slurry which was coated on copper foil, dried, and pressed to give a negative electrode. The anode electrode was die-cut into discs by a punch with a diameter of 14.3 mm.

(4) Assembly of a Lithium Ion Secondary Battery. In a dry box under an argon atmosphere, a lithium ion secondary battery was assembled using a 2032 type coin cell. That is, a cathode was placed on a cathode can, and a microporous polypropylene film (25 µm thickness and 19.1 mm diameter) was put thereon as a separator. It was pressed with a polypropylene gasket, and then an anode was placed. A stainless steel spacer and spring were put thereon to adjust a thickness and to make a good contact. An electrolytic solution of the Examples or the Comparative Example was added and let it absorbed inside the battery. Then, an anode cover was mounted thereon to seal the battery by a crimper, thus completing the assembly of the coin type lithium ion secondary battery.

(5) Testing of the Batteries. Evaluation of the aforementioned assembled batteries (e.g., Working Examples and Comparative Example) was carried out in the order (A) initial charging and discharging (confirmation of capacity) and (B) life cycle test.

A. Capacity Confirmation. Initial charging and discharging of the aforementioned assembled batteries were performed according to the constant current/voltage charging and constant current discharging method at room temperature. The battery was first charged up to 4.2 Volts (V) at a constant current rate of 0.5 mA/cm² (milliamps per square centimeter). After reaching 4.2 V, the battery was continually charged at a constant voltage of 4.2 V until the charging current reached 0.1 mA or less. Then the battery was discharged at a constant current rate of 0.5 mA/cm² until the cut-off voltage 3.0 V reached. Standard capacity (C) of a nonaqueous electrolyte secondary battery was 3.4 mAh (milliamp hours).

B. Life Cycle Test. Life cycle testing was conducted over 100 cycles at room temperature by charging the aforementioned initially charged/discharged batteries at a constant current rate of C/2 (1.7 mA) to 4.2 V and then charged at a constant voltage of 4.2 V till the current reached 0.1 mA or less. After that the battery was discharged at a constant current rate of C/2 (1.7 mA) until the cut-off voltage 3.0 V reached. Discharge capacity retention rate of cycle life (%)=($n^{th}$ cycle discharge capacity/$1^{st}$ cycle discharge capacity)×100%. First cycle efficiency is cycle discharge capacity/1st cycle charge capacity×100%. Table 2 displays the results of the life cycle testing.

TABLE 2

Life Cycle Testing Results for 1.0M $LiPF_6$ and various methyl nitrogen silylated compounds in EC/DMC/EMC (1:1:1 by weight)

| Example | 1st cycle discharge capacity (mAh) | 1st cycle efficiency | Discharge capacity retention 50th cycle | Discharge capacity retention 100th cycle |
|---|---|---|---|---|
| Example 1 | 3.38 | 91.4% | 78.0% | — |
| Example 2 | 3.62 | 91.7% | 88.0% | 85.2% |
| Example 3 | 3.55 | 91.3% | 84.0% | 75.6% |
| Example 4 | 3.56 | 94.1% | 90.1% | 84.8% |
| Example 5 | 3.53 | 94.6% | 94.9% | 92.5% |
| Example 6 | 3.55 | 89.3% | 76.7% | — |
| Example 7 | 3.50 | 90.6% | 86.8% | 82.0% |
| Example 8 | 3.42 | 91.5% | 87.2% | 87.2% |
| Example 9 | 3.39 | 91.7% | 88.7% | 88.1% |
| Comparative Example | 3.38 | 94.5% | 82.0% | 80.4% |

Additional advantages and modifications will readily occur to those skilled in the art. Therefore, the invention in its broader aspects is not limited to the specific details and illustrative example shown and described herein. Accordingly, various modifications may be made without departing from the spirit or scope of the general invention concept as defined by the appended claims and their equivalents.

What is claimed is:

1. A secondary battery comprising
   a. an anode,
   b. a cathode comprising lithium, and
   c. an electrolytic solution comprising
      i. a non-aqueous solvent,
      ii. a salt, and
      iii. a nitrogen silylated additive having the formula

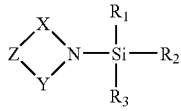

wherein $R^1$, $R^2$, and $R^3$ are each independently selected from the group consisting of hydrogen, halogen, $C_1$-$C_{20}$ alkyl, $C_1$-$C_{20}$ alkenyl, and aryl residue, wherein X and Y are each independently selected from the group consisting of hydrogen, halogen, $C_1$-$C_{20}$ alkyl, $C_1$-$C_{20}$ alkenyl, aryl, —O—, —S—, —CO—, —CO$_2$—, —SO—, —SO$_2$—, —NR$^9$—, —NR$^{10}$R$^{11}$, —PR$^{12}$—, and —Si(R$^{13}$R$^{14}$)—, wherein $R^9$ to $R^{14}$ are each independently selected from the group consisting of hydrogen, halogen, $C_1$-$C_{20}$ alkyl, $C_1$-$C_{20}$ alkenyl, and aryl, and wherein Z is selected from the group consisting of nothing, a direct bond between X and Y, —O—, —S—, —CO—, —CO$_2$—, —SO—, —SO$_2$—, —N(R$^{15}$)—, —NR$^{16}$R$^{17}$, —PR$^{18}$—, —Si(R$^{19}$R$^{20}$)—, and [C(R$^{21}$)$_2$]$_m$—, wherein $R^{15}$ to $R^{21}$ are each independently selected from the group consisting of hydrogen, halogen, $C_1$-$C_{20}$ alkyl, $C_1$-$C_{20}$ alkenyl, and aryl, and m is a number from 1 to 6.

2. The secondary battery of claim 1 wherein at least one of $R^1$, $R^2$, or $R^3$, further comprises a substituent selected from the group consisting of —O—, —S—, —CO—, —CO$_2$—, —SO—, —SO$_2$—, —NR$^4$R$^5$, —PR$^6$—, and —Si(R$^7$R$^8$)—, wherein $R^4$ to $R^8$ are each independently selected from the group consisting of hydrogen, halogen, $C_1$-$C_{20}$ alkyl, alkenyl, and aryl.

3. The secondary battery of claim 2 wherein at least one of $R^4$ to $R^8$ further comprises a substituent selected from the group consisting of —O—, —S—, —CO—, —CO$_2$—, —SO—, —SO$_2$—, amine, phosphorous linkage and silica linkage.

4. The secondary battery of claim 1 wherein $R^1$, $R^2$, and $R^3$ are $C_1$-$C_{12}$ residues.

5. The secondary battery of claim 1 wherein at least one of X, Y, or Z further comprises a substituent selected from the group consisting of —O—, —S—, —CO—, —CO$_2$—, —SO—, —SO$_2$—, —NR$_9$—, —NR$_{10}$R$_{11}$, —PR$_{12}$—, and —Si(R$_{13}$R$_{14}$)—, wherein $R_9$ to $R_{14}$ are each independently selected from the group consisting of hydrogen, halogen, $C_1$-$C_{20}$ alkyl, alkenyl, and aryl.

6. The secondary battery of claim 1 wherein at least one of $R^1$, $R^2$, and $R^3$, further comprises a substituent selected from the group consisting of —O—, —S—, —SO—, —CO—, —CO$_2$—, —C(=O)N—, and phenyl, and combinations thereof.

7. The lithium secondary battery of claim 1 wherein the additive is selected from the group consisting of:

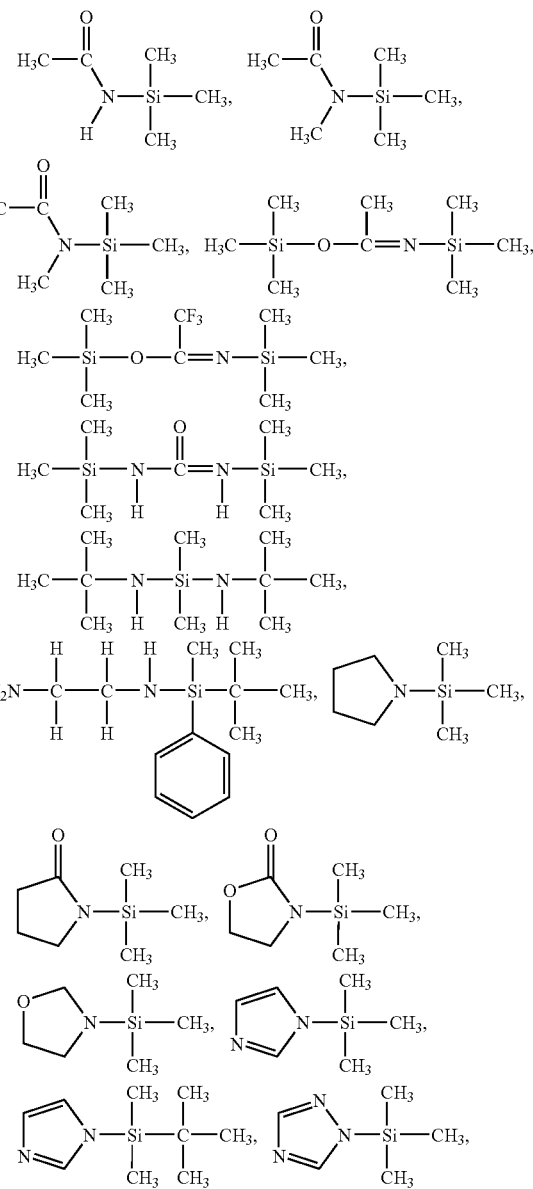

-continued

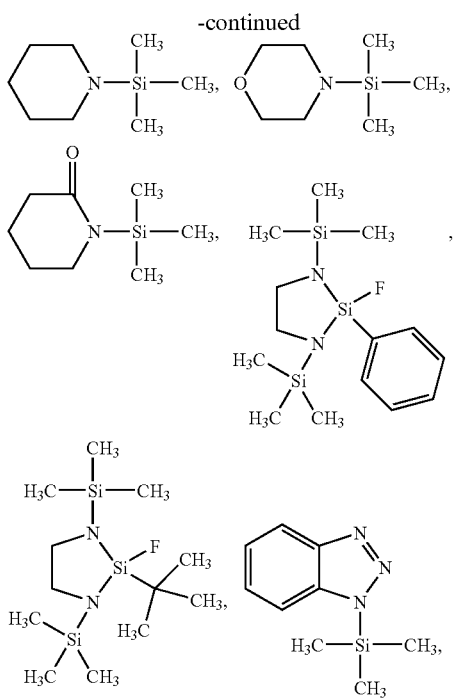

and combinations thereof.

8. The secondary battery of claim 1 wherein the salt is selected from the group consisting of $LiPF_6$, $LiBF_4$, $LiSbF_6$, $LiAsF_6$, $LiTaF_6$, $LiAlCl_4$, $Li_2B_{10}Cl_{10}$, LiBOB, LiBMB, LiB-DFMB, LiMOB, LiDFMOB, LiTOP, LiTDFMP, $LiClO_4$, $LiCF_3SO_3$; $LiN(SO_2C_mF_{2m+1})(SO_2C_nF_{2n+1})$, and $LiC(SO_2C_kF_{2k+1})(SO_2C_mF_{2m+1})(SO_2C_nF_{2n+1})$, wherein k=1-10, m=1-10, and n=1-10, respectively; $LiN(SO_2C_pF_{2p}SO_2)$, and $LiC(SO_2C_pF_{2p}SO_2)(SO_2C_qF_{2q+1})$ wherein p=1-10 and q=1-10; and $LiPF_x(R_F)_{6-x}$ and $LiBF_y(R_F)_{4-y}$, wherein $R_F$ represents perfluorinated $C_1$-$C_{20}$ alkyl groups or perfluorinated aromatic groups, x=0-5, and y=0-3.

9. The secondary battery of claim 1 wherein the non-aqueous solvent is selected from the group consisting of ethylene carbonate, propylene carbonate, butylene carbonate, dimethyl carbonate, diethyl carbonate, dipropyl carbonate, dibutyl carbonate, ethyl methyl carbonate, methyl propyl carbonate, ethyl propyl carbonate, tetrahydrofuran, 2-methyl tetrahydrofuran, 1,3-dioxolane, 1,4-dioxane, 1,2-dimethoxyethane, 1,2-diethoxyethane, 1,2-dibutoxyethane, acetonitrile, dimethylformamide, methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, γ-butyrolactone, 2-methyl-γ-butyrolactone, 3-methyl-γ-butyrolactone, 4-methyl-γ-butyrolactone, β-propiolactone, δ-valerolactone, trimethyl phosphate, triethyl phosphate, tris(2-chloroethyl)phosphate, tris(2,2,2-trifluoroethyl) phosphate, tripropyl phosphate, triisopropyl phosphate, tributyl phosphate, trihexyl phosphate, triphenyl phosphate, tritolyl phosphate, and combinations thereof.

10. The secondary battery of claim 1 wherein the cathode comprises a lithium mixed metal oxide selected from the group consisting of $LiMnO_2$, $LiMn_2O_4$, $LiCoO_2$, $Li_2Cr_2O_7$, $Li_2CrO_4$, $LiNiO_2$, $LiFeO_2$, $LiNi_zCo_{1-z}O_2$ (0<z<1), $LiFePO_4$, $Li_3VPO_4$, $LiMn_{0.5}Ni_{0.5}O_2$, $LiMn_{1/3}Co_{1/3}Ni_{1/3}O_2$, $LiNi_rCo_s\text{-}Me_tO_2$ wherein Me is selected from the group consisting of Al, Mg, Ti, B, Ga, and Si, wherein 0<r,s,t<1, and $LiMc_{0.5}Mn_{1.5}O_4$ wherein Mc is a divalent metal, and combinations thereof.

11. The secondary battery of claim 1 wherein the anode comprises a material selected from the group consisting of crystalline carbon, lithium metal, $LiMnO_2$, $Li_4Ti_5O_{12}$, LiAl, LiZn, $Li_3Bi$, $Li_3Cd$, $Li_3Sb$, $Li_4Si$, $Li_{4.4}Pb$, $Li_{4.4}Sn$, $LiC_6$, $Li_3FeN_2$, $Li_{2.6}Co_{0.4}N$, $Li_{2.6}Cu_{0.4}N$, and combinations thereof.

* * * * *